United States Patent
Hegele et al.

(10) Patent No.: US 10,919,122 B2
(45) Date of Patent: Feb. 16, 2021

(54) GRINDING AND/OR EROSION MACHINE

(71) Applicant: WALTER Maschinenbau GmbH, Tübingen (DE)

(72) Inventors: Siegfried Hegele, Dusslingen (DE); Ulrich Braendle, Stuttgart (DE)

(73) Assignee: WALTER Maschinenbau GmbH, Tübingen (DE)

(*) Notice: Subject to any disclaimer, the term of this patent is extended or adjusted under 35 U.S.C. 154(b) by 461 days.

(21) Appl. No.: 15/981,341

(22) Filed: May 16, 2018

(65) Prior Publication Data
US 2018/0333818 A1 Nov. 22, 2018

(30) Foreign Application Priority Data

May 16, 2017 (DE) ............... 20 2017 102 933.6

(51) Int. Cl.
| | |
|---|---|
| B24B 3/02 | (2006.01) |
| G05B 19/401 | (2006.01) |
| B23Q 17/24 | (2006.01) |
| B23Q 15/00 | (2006.01) |
| B24B 51/00 | (2006.01) |
| B23H 11/00 | (2006.01) |
| B23H 7/12 | (2006.01) |

(52) U.S. Cl.
CPC ............. *B24B 3/021* (2013.01); *B23Q 15/00* (2013.01); *B23Q 17/249* (2013.01); *B23Q 17/2457* (2013.01); *B24B 51/00* (2013.01); *G05B 19/401* (2013.01); *B23H 7/12* (2013.01); *B23H 11/00* (2013.01); *G05B 2219/31124* (2013.01); *G05B 2219/45161* (2013.01); *G05B 2219/50123* (2013.01); *Y02P 90/02* (2015.11)

(58) Field of Classification Search
CPC ..... B24B 53/003; B24B 3/021; G05B 19/041; G05B 2219/31124; G05B 2219/45161; G05B 2219/50123; B23Q 17/249; B23Q 17/2457; B23Q 15/00; B23B 51/00; Y02P 90/02; B23H 11/00; B23H 7/12; B23C 3/36
USPC ................... 451/5, 58, 72; 700/164
See application file for complete search history.

(56) References Cited

U.S. PATENT DOCUMENTS

| | | | |
|---|---|---|---|
| 8,708,774 B2* | 4/2014 | Diplotti .............. | B24B 3/045 451/5 |
| 2015/0140899 A1* | 5/2015 | Guo ................ | B24B 27/0084 451/5 |

* cited by examiner

*Primary Examiner* — George B Nguyen
*Assistant Examiner* — Alberto Saenz
(74) *Attorney, Agent, or Firm* — Fitch, Even, Tabin & Flannery LLP

(57) ABSTRACT

Grinding and/or erosion machine (10) for machining a chip-cutting rotary tool including a tool body (18) and several cutting plates (19) per existing pitch (TR). A control device (25) activates an axis arrangement (11) to move a machine tool (12) and the rotary tool (13) to be machined relative to each other. An interface device (26) triggers a data import function for reading-in the position data of the cutting plates (19). The position data (P) describe at least one angular value ($\alpha 1$, $\alpha 2$), a first length value ($z1$) and a second length value ($z2$). The control device (25) imports the position data (P) in chaotic order and allocates the position data (P) of each cutting plate (19) in the imported machine data set (M) to respectively one separate virtual pitch (TV), independent of whether the cutting plates (19) belong to a common pitch of the rotary tool (13).

14 Claims, 4 Drawing Sheets

Fig. 5

GRINDING AND/OR EROSION MACHINE

RELATED APPLICATION(S)

This application claims the benefit of German Patent Application No. 20 2017 102 933.6 filed May 16, 2017, the contents of which is incorporated herein by reference as if fully rewritten herein.

TECHNICAL FIELD

The invention relates to a grinding and/or erosion machine for machining a chip-cutting rotary tool, in particular a rotary tool for wood processing.

BACKGROUND

Such rotary tools for wood processing comprise a plurality of cutting plates that are arranged on a tool body of the rotary tool. During the manufacture of such a tool, the cutting plates are frequently soldered to the tool body. Due to the soldering, the position of the cutting plates is subjected to production-specific tolerances with respect to a reference coordinate system that is fixed relative to the tool body, even if soldering is performed by machine. After the cutting plates have been mounted as blanks, so to speak, to the tool body, they are machined in order to obtain their final cutting plate geometry. For machining, it is necessary to know the position of the cutting plates.

Such rotary tools comprise several cutting plates per pitch, and the number of pitches may vary. Until now, the position of each cutting plate was detected individually, the cutting plate was allocated to a specific pitch of the rotary tool, and these position data were entered into the grinding and/or erosion machine in order to be able to subsequently machine the cutting plates.

This method is very time-consuming and, as a rule, was performed manually. Therefore, the time for producing a rotary tool was very long.

It is the object of the present invention to simplify the production of a rotary tool and, in particular, to shorten the production time.

SUMMARY

According to the invention, the grinding and/or erosion machine is configured to machine a chip-cutting rotary tool, for example, within the framework of the production of such a rotary tool or also within the framework of a truing operation. The rotary tool has one pitch and, as a rule, two pitches, each having several cutting plates per pitch that are arranged along a tool body extending along a longitudinal axis. The cutting plates are usually provided on the tool body.

The grinding and/or erosion machine comprises a control device and an axis arrangement that is activated by the control device. By means of the axis arrangement, it is possible to move and align a machine tool for machining the cutting plates of the rotary tool relative to the rotary tool. Furthermore, the grinding and/or erosion machine comprises an interface device that is communicatively connected to the control device. A user can trigger a data import function via the interface device. The control device is configured to import or read-in position data of the cutting plates when executing the data import function. For each cutting plate, position data comprise an angular value describing the angular position about the tool longitudinal axis, a first length value as well as a second length value. Optionally, there may be at least one radial distance value included in the position data for each of the cutting plates or for all of the cutting plates together, said radial distance value stating a radial distance of a defined point or the edge of the cutting plate from the longitudinal axis L. The first length value describes an edge position of a first edge of the affected cutting plate in the direction parallel to the tool longitudinal axis and the second length value describes, accordingly, an edge position of a second edge of the same cutting plate opposite the edge of the first edge, viewed in the direction parallel to the tool longitudinal axis. The first edge and the second edge extend at a right angle or obliquely with respect to the tool longitudinal axis.

Furthermore, the control device is disposed, during the data import function, to import the position data in a chaotic order or in sequential order. Consequently, the position data are imported independent of the allocation relative a specific pitch in a random sequence. It is only of importance that the position data of all the cutting plates be imported, wherein the allocation to a specific pitch or the sequence is random, and the allocation to a pitch is not or need not be a component of the position data. In the imported machine data set, the position data of each cutting plate are allocated to each cutting plate independent of the actual allocation to the pitch of the rotary tool, respectively to one separate virtual pitch. In the machine data set, each individual cutting plate is allocated to a separate virtual pitch. Therefore, there is no grouping of the position data of the cutting plates in the machine data set, considering the actual pitch of the rotary tool.

Therefore, the grinding and/or erosion machine is capable of importing and processing chaotic, unordered position data. It is possible for the position data to be imported either from a CAD data set for the engineering of the tool, so that the desired position of each cutting tool exists as position data. Alternatively, it is possible to detect the position data in a measuring device, so that the actual position of each cutting plate is known, which increases accuracy.

It is advantageous if the position data comprise only one or two angular values, the first length value and the second length value for each cutting edge, as well as, optionally, at least one radial distance value for each or all cutting edges. Further data are not required.

Preferably, the control device is configured to import the position data in an XML data format. Alternatively or additionally, the control device may also be configured to import other or additional data formats such as, for example, ASCII files or data formats such as JSON, CSV, XLS, XLSX, DMI, etc.

In a preferred embodiment, the control device is further configured to perform an alignment detection process, wherein the alignment or orientation of each cutting plate relative to a reference coordinate system is detected. The imported position data do not contain such an orientation or alignment. The alignment detection process preferably uses the imported position data in order to determine the alignment of each individual cutting plate.

In one exemplary embodiment, the grinding and/or erosion machine comprises a probe device that can be moved or aligned by means of the axis arrangement relative to the rotary tool that is to be machined. In particular, the probe device is configured to probe an edge and preferably a surface of a cutting plate at a probing point—without contact or with contact. The probe device may comprise a mechanical tactile element that transmits a probing signal at contact with the cutting plate. Preferably, the probe device is configured as a switching probe device. The probe device may also operate in a contactless manner, for example in an optical manner, in order to detect the position at a probing point on the cutting plate in the reference coordinate system.

It is advantageous if the control device is configured to calculate several probing points on each cutting plate based on the imported position data or based on the machine data set. Parallel to the longitudinal axis, each cutting plate extends between the first length value and the second length value. Therefore, the control device is able to probe a surface between the first edge and the second edge at several probing points. It is advantageous if the probing points are arranged on a common flat surface.

The control device may be configured to determine the alignment of the surface and thus the alignment of the cutting plate in the reference coordinate system with the use of the position of the probing points relative to the reference coordinate system. Preferably, each cutting plate is probed at at least three and, in particular exactly three, probing points.

Furthermore, it is advantageous if the control device is configured to activate the axis arrangement, so that the probe device will probe each cutting plate in sequence at the respectively calculated probing points. In this manner, it is possible to determine the alignment of each cutting plate relative to the reference coordinate system.

Furthermore, it is preferred if the control device is configured to trigger and control a machining process after determining the alignment of each cutting plate relative to the reference coordinate system. During the machining process the control device controls the axis arrangement and the machine tool in order to process each of the existing cutting plates and adapt their geometry to a specified desired geometry.

The grinding and/or erosion machine described hereinabove may be a component of the system that additionally comprises a setup and/or measuring machine that is configured to determine position data. The setup and/or measuring machine is communicatively connected in particular to the grinding and/or erosion machine, for example via a line and/or a network and/or a wireless connection. Preferably, the control device is disposed—while executing the data import function—to read in or import the position data via the existing communication connection of the setup and/or measuring machine.

BRIEF DESCRIPTION OF THE DRAWINGS

Advantageous embodiments of the invention can be inferred from the dependent claims, the description and the drawings. Hereinafter, preferred exemplary embodiments are explained individually with reference to the appended drawings. They show in FIG. 1 a schematic, block diagram-like representation of an inventive grinding and/or erosion machine that can be communicatively connected to a setup and/or measuring machine in a system, FIG. 2 a schematic representation of an indexable cutting plate and its position and orientation relative to a reference coordinate system, FIG. 3 a perspective representation of an exemplary embodiment of a rotary tool that is to be machined, FIG. 4 an exemplary representation of a view of a user interface of a setup and/or measuring machine, FIG. 5 an exemplary representation of a user interface device of the grinding and/or erosion machine.

DETAILED DESCRIPTION

Figure 1:
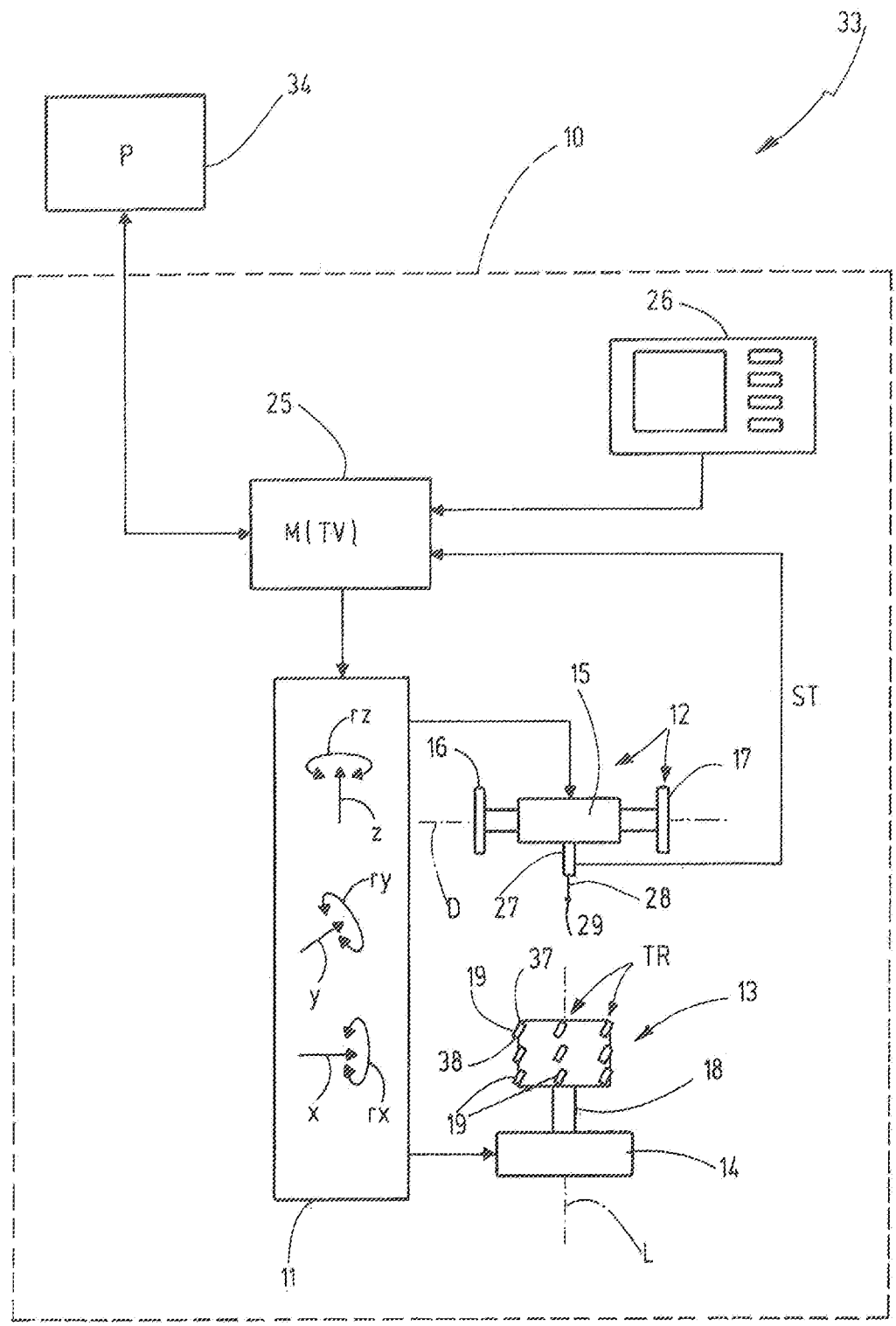

FIG. 1 shows—greatly simplified and in the manner of a schematic block diagram—a grinding and/or erosion machine 10. The grinding and/or erosion machine 10 comprises an axis arrangement 11 that comprises at least one and preferably several translational and/or rotational machine axes. Via the axis arrangement 11, a machine tool is moved and aligned relative to a rotary tool 13 or a tool clamping device 14. For example, a drivable machine spindle 15 may belong to the machine tool 12. Provided on the machine spindle, there is a grinding tool or erosion tool 16 or erosion tool 17, depending on whether or not the machine is a grinding machine, an erosion machine or a combined grinding and/or erosion machine. Therefore, the machine tool 12 may be either the grinding tool 16 and/or the erosion tool 17.

The grinding tool 16 and/or the erosion tool 17 can be driven via the machine spindle 15 about an axis of rotation D. during the erosion process, the erosion tool 17 can be rotationally driven, or stopped, around the axis of rotation D.

The axis arrangement 11 can move the machine tool 12 and/or the tool clamping device 14 with the rotational tool 13 to be machined in up to six degrees of freedom, for example, in up to three linear degrees of freedom x, y, z, as well as in up to three rotational degrees of freedom rx, ry, rz. Which of the machine axes or translational or rotational degrees of freedom are used for the movement of the tool clamping device 14 and for the movement of the machine tool 12 and the machine spindle 15, respectively, may be chosen independently of the specific design of the machine.

The rotary tool 13 to be machined in accordance with the example is a rotary tool 13 for processing wood. Said tool comprises a tool body 18 that extends along a tool longitudinal axis L. A plurality of cutting plates 19 is arranged on the tool body 18. The cutting plates 19 are mounted coaxially with respect to the tool longitudinal axis L to the tool body 18, in particular by a soldered connection to the corresponding support surfaces of the tool body 18. The grinding and/or erosion machine 10 is configured to machine the cutting plates 19 in order to produce a specified desired geometry on the cutting plates 19. This is preferably done by an erosion process with an erosion tool 17.

Figure 5:
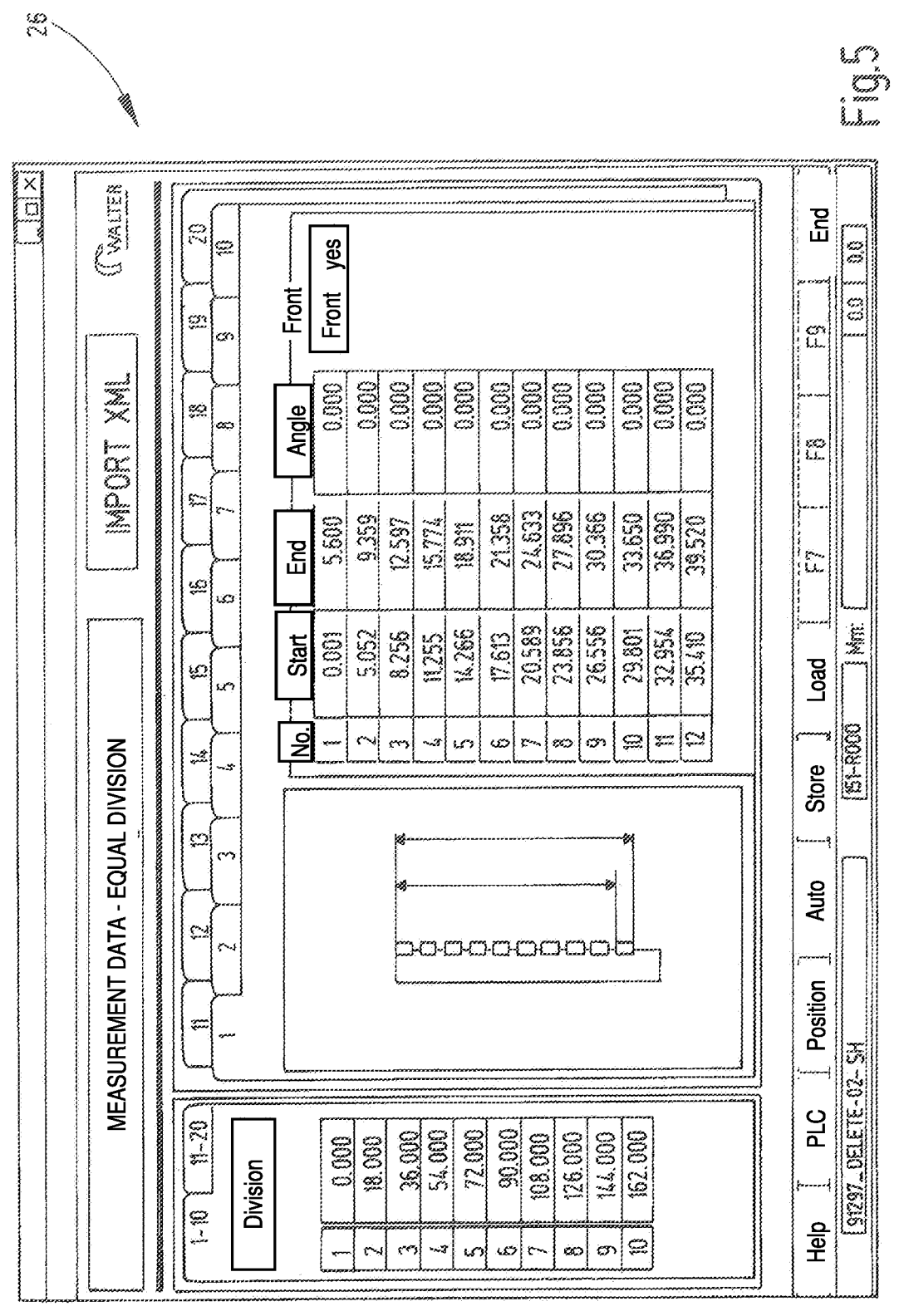

The activation of the axis arrangement 11 occurs by means of a control device 25. The control device 25 is communicatively connected to an interface device 26. Via the interface device 26, a user may perform entries and transmit them to the control device 25. The control device 25 may output data for the user via the interface device 26. For example, to do so, the interface device 26 may comprise a touch-sensitive image screen or other known input and/or output means. FIG. 5 shows an exemplary display on a touch-sensitive screen of the interface device 26.

Furthermore, the grinding and/or erosion machine 10 comprises a probe device 27. The probe device 27 may be configured for contacting or contactless probing of a cutting plate 19. In the exemplary embodiment that is schematically shown here, the probe device comprises a tactile element 28, for example a stylus having a tactile body 29 on its end. Preferably, the tactile body 29 represents a ball tip. If the tactile body 29 comes into contact with a cutting plate 19, the contact is detected by the probe device 27, and a tactile signal ST that is transmitted by the probe device 27 to the control device 25 indicates the contact between the tactile body 29 and the cutting plate 19. As an alternative to the depicted exemplary embodiment, the probe device 27 may also operate in a contactless manner, for example, optically.

The probe device 27 is preferably mounted in the region of the machine spindle 15 and can thus be moved and positioned, together with the machine tool 12, relative to the rotary tool 13. In another embodiment it is also possible to move and position the probe device 27 via an axis arrangement 11, independently of the machine tool 12. The probe device 27 may also be arranged in a stationary manner, so that only the tool clamping device 14 is moved for probing.

As is schematically illustrated by FIG. 1, the grinding and/or erosion machine 10 belongs to a system 33 that also comprises the setup machine 34. Additionally or alternatively, the system 33 could also comprise a measuring machine. The setup machine 34 and the grinding and/or erosion machine 10 and, in accordance with the example, the control device 25 are communicatively connected. The communication connection may be wired or wireless, for example via a direct connection or a network.

Figure 2:
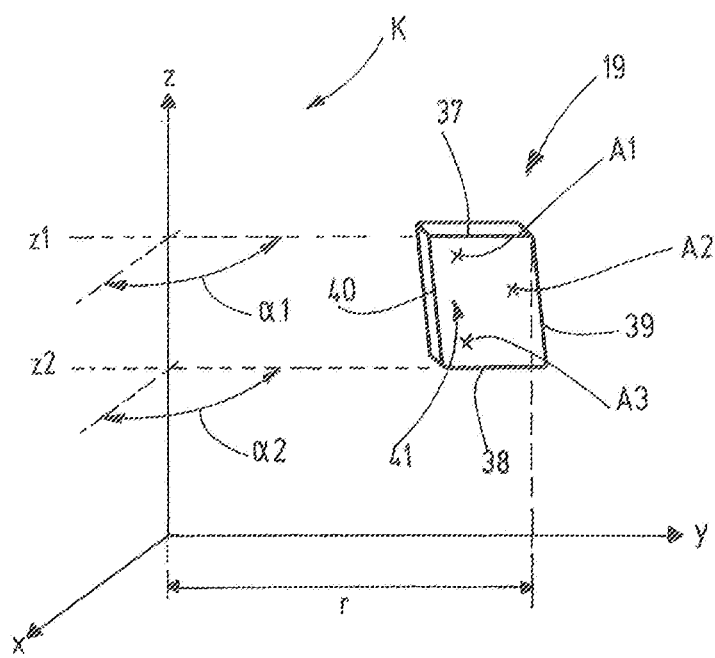

In the exemplary embodiment, the setup machine 34 is configured to determine position data P of the cutting plates 19 of the rotary tool relative to a reference coordinate system K that is shown schematically in FIG. 2. The reference coordinate system K is stationary relative to the rotary tool 13, and the z-axis of the reference coordinate system K is aligned preferably along the tool longitudinal axis L. The x-axis or y-axis of the reference coordinate system K forms a reference plane together with the z-axis in order to indicate an angular value $\alpha$ about the tool longitudinal axis L, said angular value describing a rotation of a cutting plate 19 or on a cutting plate 19 in circumferential direction about the tool longitudinal axis L. Each cutting plate 19 may be allocated a single angular value or also a first angular value $\alpha 1$, as well as a second angular value $\alpha 2$. Several angular values are expedient if the cutting plate 19 is not oriented parallel to a radial plane relative to the tool longitudinal axis L but extends inclined relative to such a radial plane.

Each cutting plate 19 has a first edge 37—and viewed parallel to the tool longitudinal axis L (z-direction in the reference coordinate system K)—a second edge 38 at a distance from the first edge 37. The first edge 37 and the second edge 38 may be aligned parallel to each other. The first edge 37 and the second edge 38 extend in one direction, respectively, that may be at a right angle or oblique with respect to the tool longitudinal axis L.

The first edge 37 and the second edge 38 are connected to each other via an outer edge 39 and an inner edge 40 of the cutting plate 19. The outer edge 39 and the inner edge 40 are located on opposite sides, in which case the outer edge 39 is located radially outside and the inner edge 40 is located radially inside—with respect to the tool longitudinal axis L. A cutting edge, as well as a free surface of the cutting plate 19, may be produced on the outer edge 39 during the machining process by means of the grinding and/or erosion machine.

The first edge 37 may be associated with a first length value z1, and the second edge 38 may be associated with a second length value z2. The length values z1, z2 relate to a direction parallel to the tool longitudinal axis L. The length values z1, z2 describe the distance from the origin of the reference coordinate system K. If the first edge 37 extends at a right angle with respect to the tool longitudinal axis L, all points on the first edge 37 have the first length value z1. If the first edge 37 extends inclined with respect to the tool longitudinal axis L, it is sufficient to detect a single length value of the first edge 37, preferably at a point directly adjoining the outer edge 39 or an adjoining radially outer section of the first edge 37. The same applies analogously to the second edge 38.

Furthermore, the cutting plate 19 is allocated at least one radial distance value r. For example, the corner region between the outer edge 39 and the first edge 37 can be allocated the radial distance value r of the cutting plate 19. It is also possible to detect several radial distance values per cutting plate 19 and to allocate them to the cutting plate 19.

As has already been explained, each cutting plate 19 is furthermore allocated at least one angular value $\alpha$. This at least one angular value may be, for example, the first angular value $\alpha 1$ that describes an angle of rotation between the reference plane (here: x-z-plane of the reference coordinate system K) in circumferential direction about the tool longitudinal axis L that is taken by a corresponding point or a corresponding location of the cutting plate 19. For example, the first angular value $\alpha 1$ is allocated to the first edge 37 or the corner region between the first edge 37 and the outer edge 39. In the example shown in FIG. 2, the cutting plate 19 is also allocated to a second angular value $\alpha 2$ that corresponds to the position of the second edge 38 in circumferential direction about the tool longitudinal axis L.

Consequently, the setup machine 34 detects the position data P for each cutting plate 19, in which case the position data P comprise at least one angular value $\alpha 1$ and/or $\alpha 2$, the first length value z1 of the first edge 37, the second length value z2 of the second edge 38, as well as at least one radial distance value r, wherein the at least one radial distance value r may be included in the position data P—separately for each cutting plate 19 or together for all cutting plates 19.

The control device 25 of the grinding and/or erosion machine 10 is configured to execute a data import function. The data import function may be triggered, for example, by a user via the interface device 26. The control device 25 is configured to read in or import the position data P of the cutting plates 19 while executing the data import function. In the exemplary embodiment shown in FIG. 1, the position data P can be imported from the measuring machine 34 and stored as the machine data set M in a memory of the control device 25.

Figure 3:
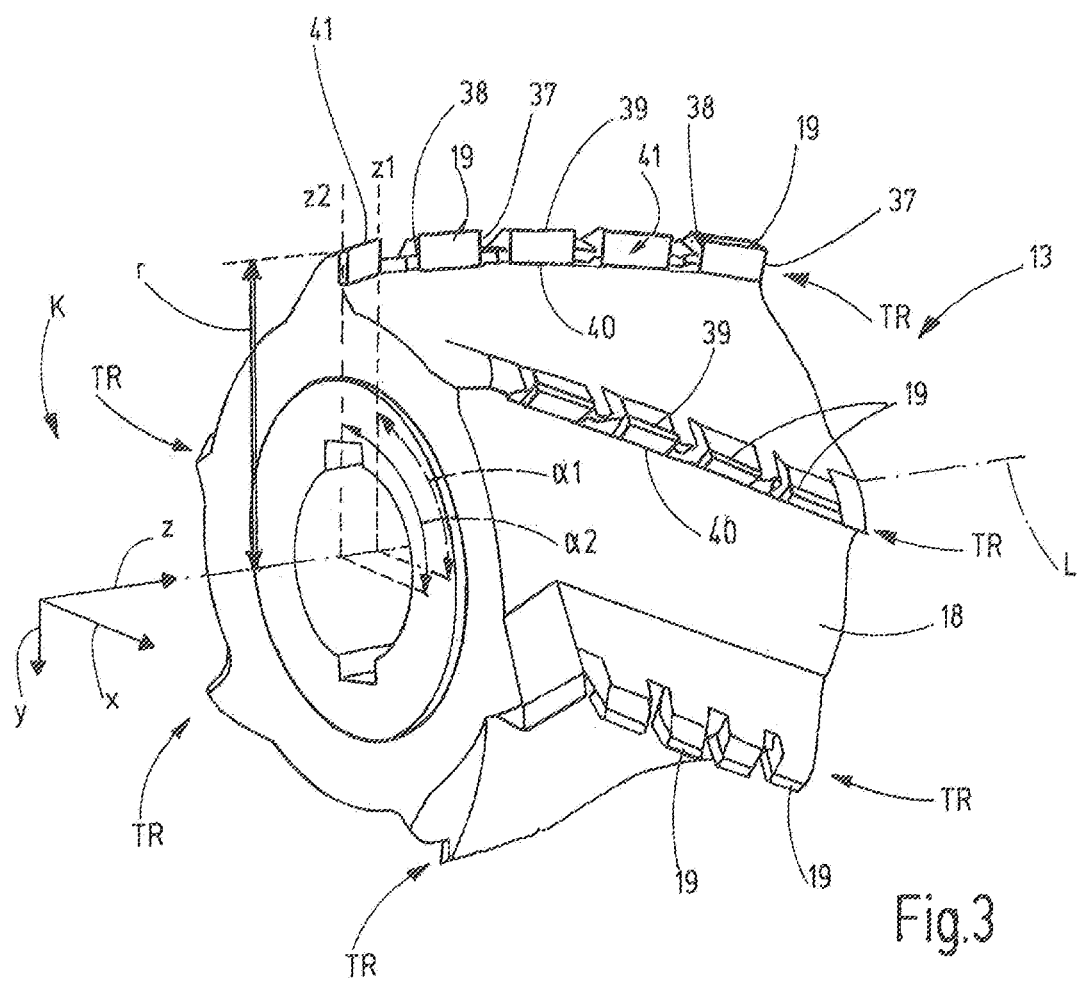

As is schematically illustrated in FIG. 1 and in the rotary tool 13 in FIG. 3, the rotary tool 13 comprises several pitches TR. Each pitch TR of the rotary tool 13 contains several cutting plates 19 that may be arranged on a straight line or on a spiral path or on another specified path. In the exemplary embodiment illustrated in FIG. 3 the rotary tool 13 has six pitches TR, each with four or five cutting plates. The number of cutting plates 19 per pitch TR may vary. The number of pitches TR may be even and is preferably odd. Via the number of pitches TR and the radial distance of the cutting plates 19, it is possible to specify the chip-cutting region in circumferential direction about the tool longitudinal axis L between two cutting plates 19 in sequence in the direction of rotation of the rotary tool 13.

The control device 25 is configured to prepare a separate virtual pitch TV during data import for the position data of each cutting plate 19. The position data P of the cutting plates 19 may thus exist chaotically without allocation to an actual pitch TR of the rotary tool 13. In the machine data set M, the position of each cutting plate 19 is detected as a separate virtual pitch, and this machine data set M is used as basis for machining the rotary tool 13 with the machine tool 12. No explicit information that states which one of the cutting plates 19 are actually located on a shared pitch TR of the rotary tool 13 is present in the machine data set M. At best, this information can be directly derived from the position data, if the pitches TR on the rotary tool 13 are spatially sufficiently different from each other. Depending on the arrangement of the pitches TR, a distinction or allocation of the individual cutting plates 19 with respect to an actual pitch TR on the rotary tool 13 with the use of the machine data set M may either not be possible or only possible with great difficulty, for example, if the spiral path of each pitch displays a very flat pitch angle about the tool longitudinal axis L. In any event, the machine data set M contains no explicit allocation of the individual cutting plates to an actual pitch TR on the rotary tool 13.

Furthermore, the control device 25 is configured to perform an alignment process after importing the position data P on the basis of the machine data set M. During this alignment process, the alignment of each cutting plate 19 relative to the reference coordinate system K is determined. In the exemplary embodiment described here, the control device 25 is configured to perform the alignment determination process as follows:

Several, three in accordance with the example, three probing points A1, A2 and A3 on a surface 41 of each cutting plate 19 can be determined by the control device 25 based on the machine data set and the known position of the first edge 37 and the second edge 38. To do so, respectively one specified distance from the first edge 37, the second edge 38, the outer edge 39 and the inner edge 40 is maintained; and, on the surface 41 that connects the edges 37 to 40, three spaced apart probing points A1, A2 and A3 are defined. The surface 41 faces away from the tool body 18, and the cutting plate 19 is mounted with an underside opposite the surface 41 to a support surface of the tool body 18, for example by an appropriate soldering connection.

These three probing points A1, A2 and A3 are determined for each cutting plate 19. Furthermore, the control device 25 is configured to activate the axis arrangement 11, so that, by means of the probe device 27, each of the probing points A1, A2, A3 on each cutting plate 19 is addressed and probed. With the three probing points A1, A2 and A3 on the surface 41 of the cutting plate 19, it is possible to determine the orientation of the surface 41 relative to the reference coordinate system K. This is necessary in order to be able to perform the subsequent processing of the cutting plate 19. The orientation of the surface 41 defines the alignment of the cutting plate 19 and thus its alignment or orientation in space, relative to the reference coordinate system K. This alignment may be affected by tolerances depending on the manufacturing process and on the mounting of the cutting plates 19 to the tool body 18.

After the control device 25 has detected the orientation of all the cutting plates 19, the control device 25 activates the axis arrangement 11 in order to machine the cutting plates 19 in a material-ablating manner by means of the machine tool 12 and, preferably, by means of the erosion tool 17, and to produce a cutting plate geometry that corresponds to a desired geometry.

After machining the rotary tool 13, it can be measured in a measuring machine in order to verify whether or not the produced geometry of the cutting plates 19 corresponds to the desired geometry. Optionally, the geometry data of the grinding and/or erosion machine 10 determined in doing so can be transmitted again, and reworking may be take place, should this be necessary.

In the exemplary embodiment illustrated by FIG. 1 the grinding and/or erosion machine 10 is a component of the system 33 and communicationally connected to the setup machine 34. If a communications connection with the setup machine 34 for reading-in the position data P does not exist, the position data P may also be read in based on CAD engineering data, and a corresponding machine data set M may be generated.

The position data P are imported by the control device 25, preferably in XML data format, and are also stored in XML format as the machine data set M. The use of other data formats is also possible.

Figure 4:
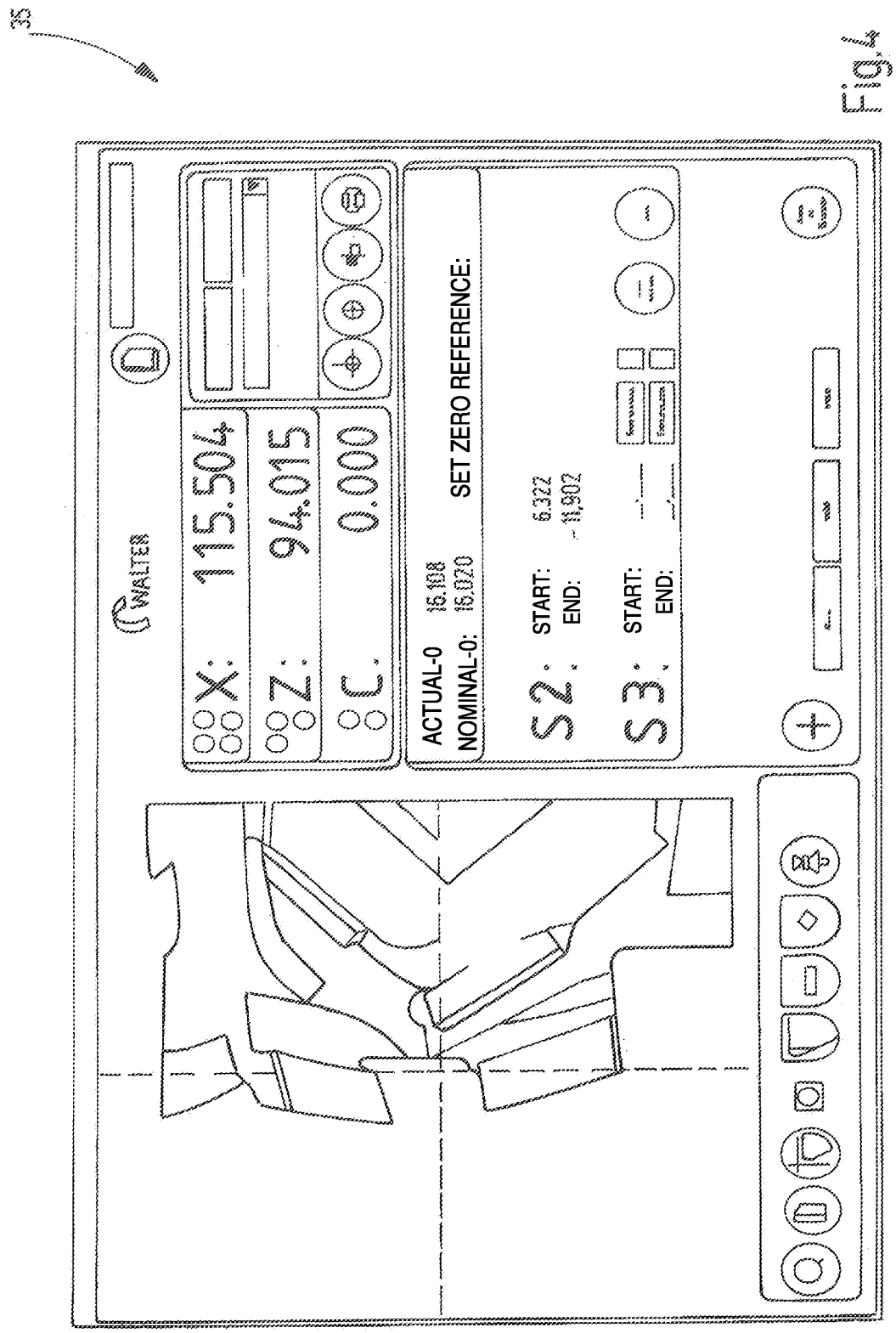

FIG. 4 illustrates an exemplary view of a display of the user interface 35 of the setup machine 34.

LIST OF REFERENCE SIGNS

10 Grinding and/or Erosion machine
11 Axis arrangement
12 Machine tool
13 Rotary tool
14 Tool clamping device
15 Machine spindle
16 Grinding tool
17 Erosion tool
18 Tool body
19 Cutting plate
25 Control device
26 Interface device
27 Probe device
28 Tactile element
29 Tactile body
33 System
34 Setup machine
35 User interface of the setup machine
37 First edge
38 Second edge
39 Outer edge
40 Inner edge
41 Surface
α1 First angular value
α2 Second angular value
A1 First probing point
A2 Second probing point
A3 Third probing point
D Axis of rotation
K Reference coordinate system
L Tool longitudinal axis
M Machine data set
P Positioning data
r Radial distance value
ST Tactile signal
TR Pitch of the rotary tool
TV Virtual pitch
z1 First length value
z2 Second length value

What is claimed is:

1. Grinding and/or erosion machine (10) that is configured to machine a chip-cutting rotary tool (13), that comprises a tool body (18) extending along a tool longitudinal axis (L), and having several cutting plates (19) per existing pitch (TR), said cutting plates being mounted to the tool body (18), wherein the machine comprises:

a control device (25) configured to activate an axis arrangement (11) of the grinding and/or erosion machine (10) in order to move a machine tool (12) of the grinding and/or erosion machine (10) and the rotary tool (13) to be machined relative to each other, an interface device (26) that is communicatively connected to the control device (25), wherein a user is able to use the interface device (26) to trigger a data import function of the control device (25) for reading-in position data of the cutting plates (19) into an imported machine data set (M), wherein the position data (P) for each of the cutting plates (19) comprise at least one angular value (α1, α2) describing an angular position about the tool longitudinal axis (L), a first length value (z1) and a second length value (z2), wherein the first length value (z1)

describes an edge position of a first edge (37) of a respective cutting plate (19) of the cutting plates (19) in a direction parallel to the tool longitudinal axis (L), and wherein the second length value (z2) describes an edge position of a second edge (38) of the respective cutting plate (19) in a direction parallel to the tool longitudinal axis (L), said second edge being opposite the first edge (37), wherein the control device (25) is configured to import the position data (P) during the data import function in chaotic order and to allocate the position data (P) of each of the cutting plates (19) in the imported machine data set (M) respectively to a separate virtual pitch (TV), independent of whether or not the cutting plates (19) do in fact belong or not belong to a common pitch of the rotary tool (13).

2. Grinding and/or erosion machine according to claim 1, wherein the position data (P) comprise only one or two angular values (α1, α2), the first length value (z1), and the second length value (z2) for each cutting plate (19), as well as at least one radial distance value (r) for each or for all the cutting plates (19).

3. Grinding and/or erosion machine according to claim 1, wherein the control device (25) is configured to import the position data (P) existing in XML data format.

4. Grinding and/or erosion machine according to claim 1, wherein the control device (25) is configured to perform an alignment determination process, wherein an alignment of each of the cutting plates (19) relative to a reference coordinate system (K) is determined.

5. Grinding and/or erosion machine according to claim 1, wherein a probe device (27) is provided that can be moved relative to the rotary tool (13) using the axis arrangement (11).

6. Grinding and/or erosion machine according to claim 5, wherein the probe device (27) is configured to probe an edge (37, 38, 39) and/or a surface (41) of one of the cutting plates (19) at at least one probing point (A1, A2, A3) in a contacting or contactless manner.

7. Grinding and/or erosion machine according to claim 6, wherein the control device (25) is configured to calculate several probing points (A1, A2, A3) on each of the cutting plates (19) based on the imported position data (P).

8. Grinding and/or erosion machine according to claim 7, wherein the probing points (A1, A2, A3) are located on a common flat surface (41) of the respective cutting plate (19).

9. Grinding and/or erosion machine according to claim 7, wherein the control device (25) is configured to activate the axis arrangement (11) so that the probe device (27) is able to probe each cutting plate (19) in sequence at the calculated probing points (A1, A2, A3).

10. Grinding and/or erosion machine according to claim 9, wherein the control device (25) is configured to determine the alignment of each of the cutting plates (19) relative to a reference coordinate system (K).

11. Grinding and/or erosion machine according to claim 10, wherein the control device (25) is configured to perform a machining process after determining the alignment of each cutting plate (19) relative to the reference coordinate system (K), during which process each of the cutting plates (19) is machined in order to correspond to a desired geometry specified in the control device (25).

12. System (33) comprising a setup and/or measuring machine (34) that is configured to determine position data, as well as comprising a grinding and/or erosion machine (10) that is configured to machine a chip-cutting rotary tool (13), that comprises a tool body (18) extending along a tool longitudinal axis (L), and having several cutting plates (19) per existing pitch (TR), said cutting plates being mounted to the tool body (18), wherein the machine comprises:

a control device (25) configured to activate an axis arrangement (11) of the grinding and/or erosion machine (10) in order to move a machine tool (12) of the grinding and/or erosion machine (10) and the rotary tool (13) to be machined relative to each other, an interface device (26) that is communicatively connected to the control device (25), wherein a user is able to use the interface device (26) to trigger a data import function of the control device (25) for reading-in position data of the cutting plates (19) into an imported machine data set (M), wherein the position data (P) for each of the cutting plates (19) comprise at least one angular value (α1, α2) describing an angular position about the tool longitudinal axis (L), a first length value (z1) and a second length value (z2), wherein the first length value (z1) describes an edge position of a first edge (37) of a respective cutting plate (19) of the cutting plates (19) in a direction parallel to the tool longitudinal axis (L), and wherein the second length value (z2) describes an edge position of a second edge (38) of the respective cutting plate (19) in a direction parallel to the tool longitudinal axis (L), said second edge being opposite the first edge (37), wherein the control device (25) is configured to import the position data (P) during the data import function in chaotic order and to allocate the position data (P) of each of the cutting plates (19) in the imported machine data set (M) respectively to a separate virtual pitch (TV), independent of whether or not the cutting plates (19) do in fact belong or not belong to a common pitch of the rotary tool (13).

13. System according to claim 12, wherein a communication connection exists between the setup and/or measuring machine (34) and the grinding and/or erosion machine (10), and wherein the control device (25) is configured to import the position data (P), using the communication connection, from the setup and/or measuring machine (34) while the data import function is being executed.

14. Grinding and/or erosion machine according to claim 4, wherein the control device (25) is configured to perform a machining process after determining the alignment of each cutting plate (19) relative to the reference coordinate system (K), during which process each of the cutting plates (19) is machined in order to correspond to a desired geometry specified in the control device (25).

* * * * *